No. 851,549. PATENTED APR. 23, 1907.
J. W. NEAL.
WAVE MOTOR.
APPLICATION FILED JUNE 5, 1906.
5 SHEETS—SHEET 1.
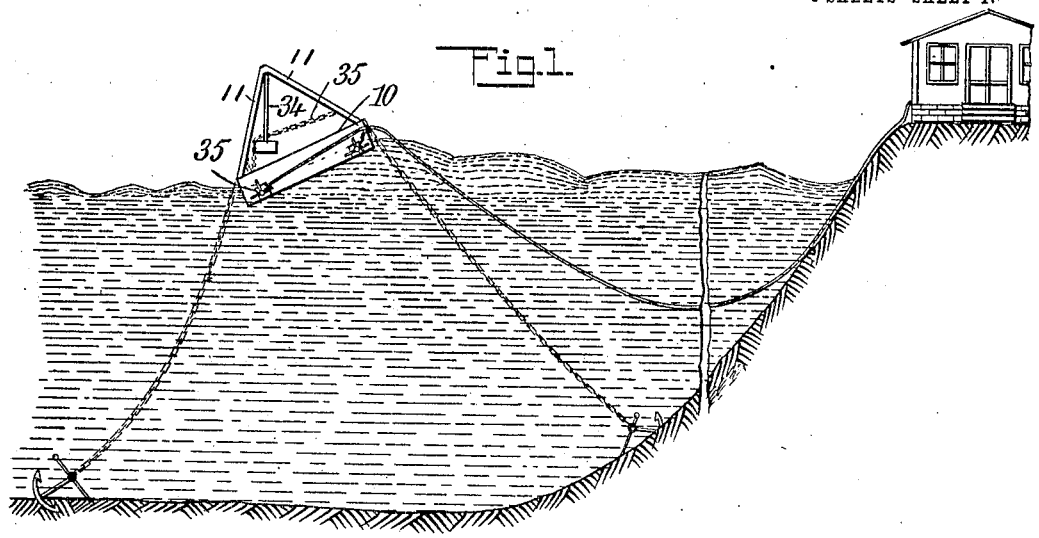
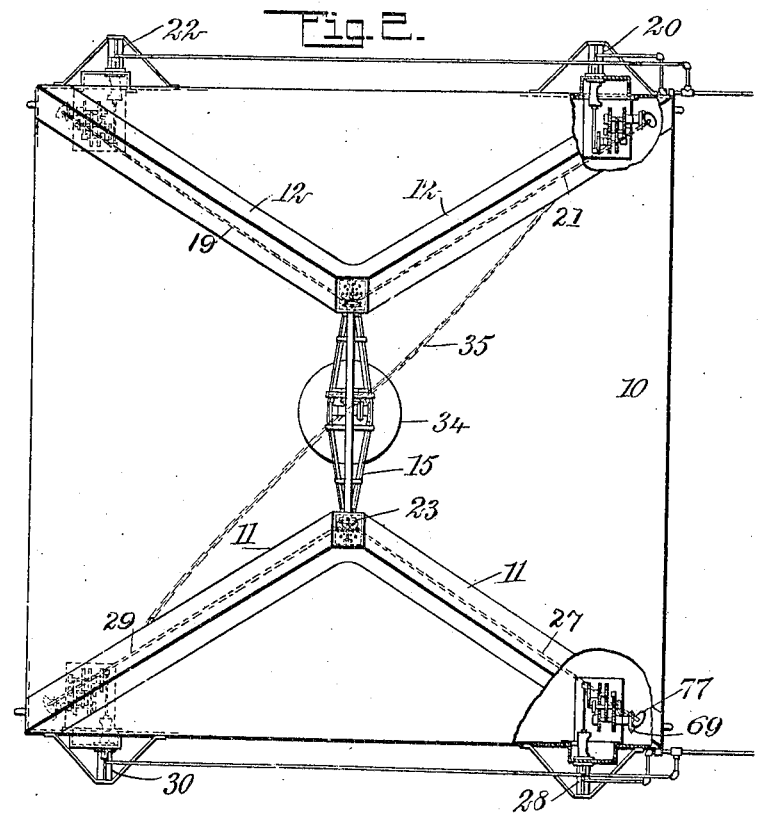
WITNESSES
INVENTOR
John W. Neal
BY
ATTORNEYS

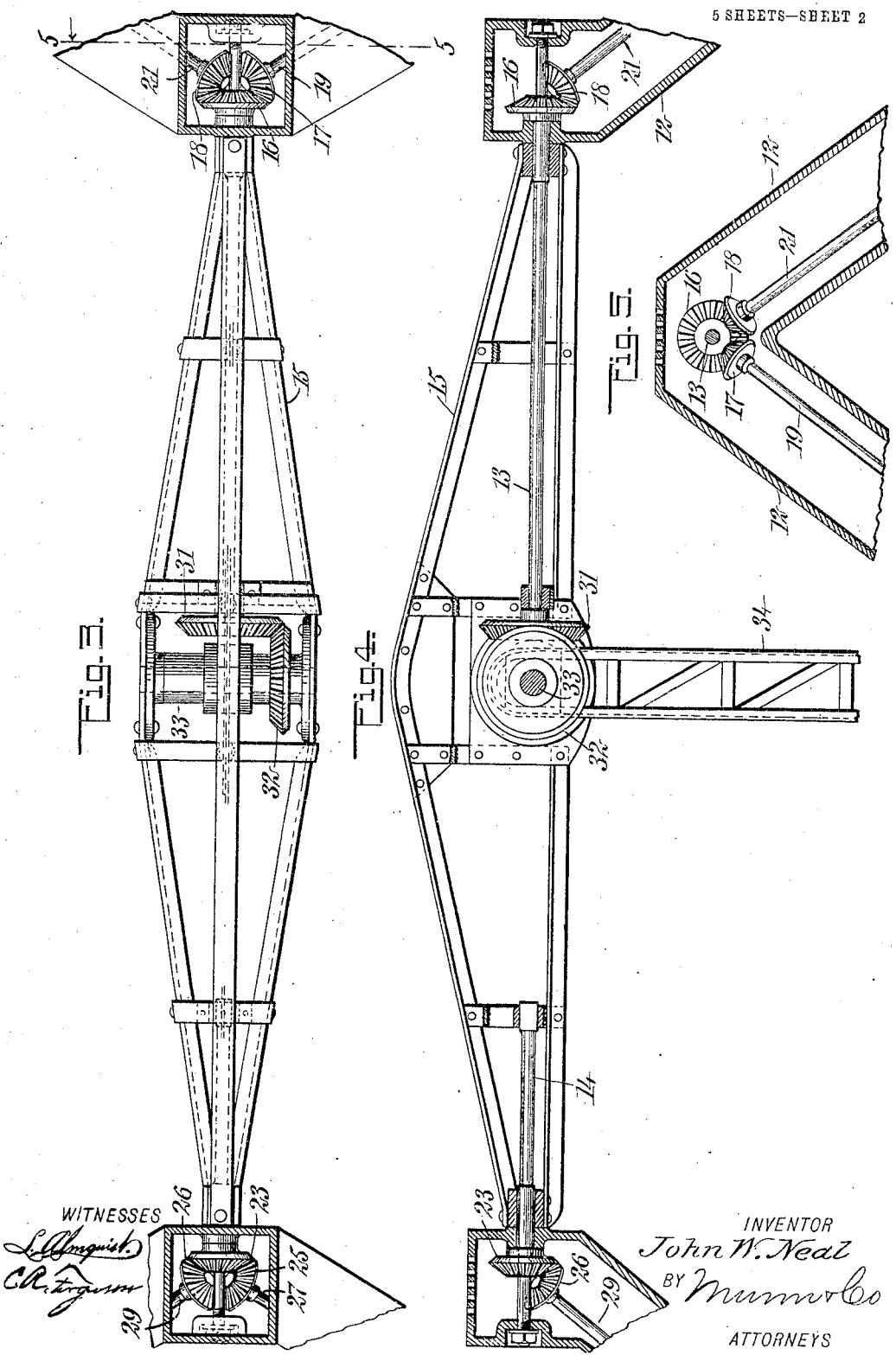

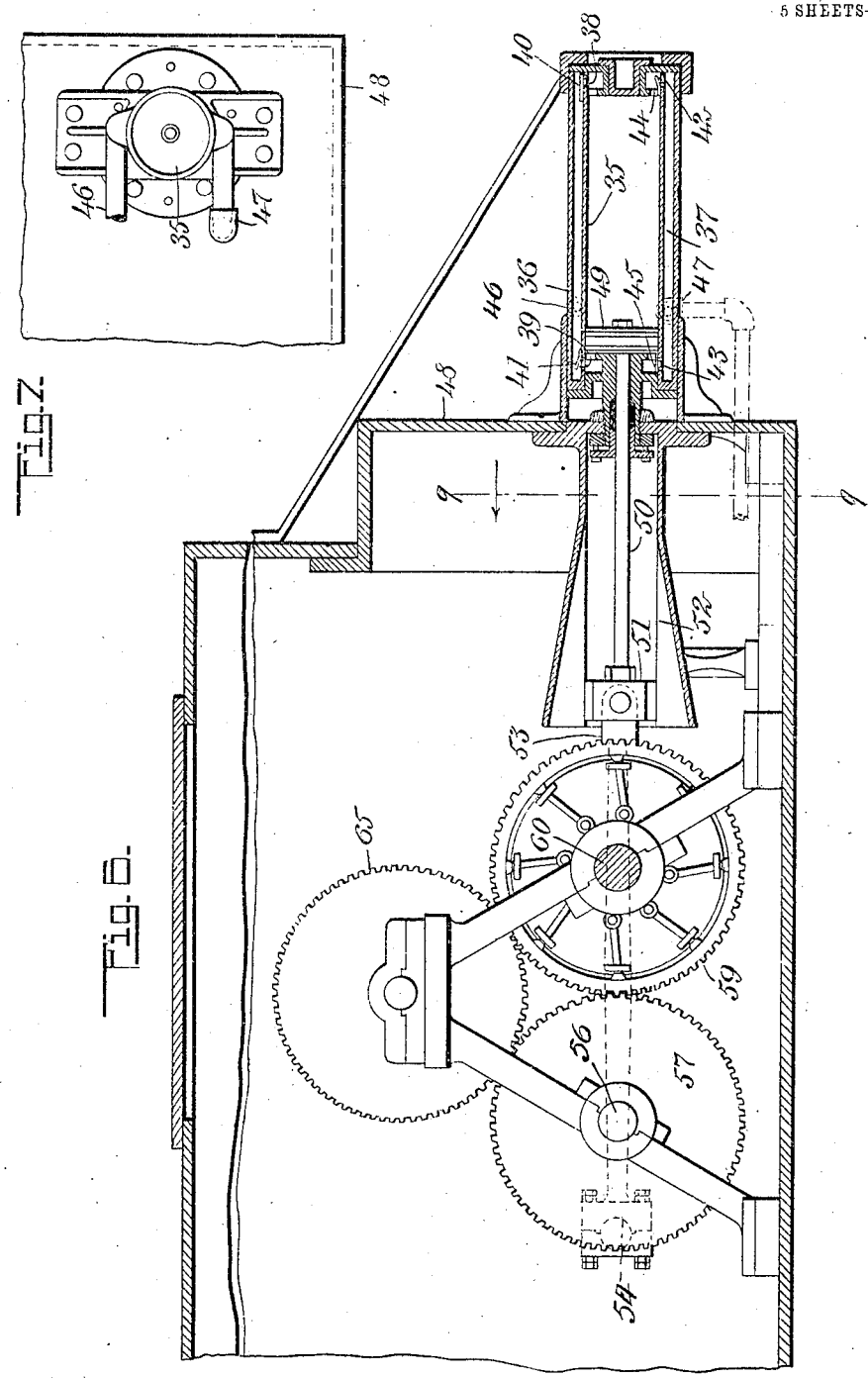

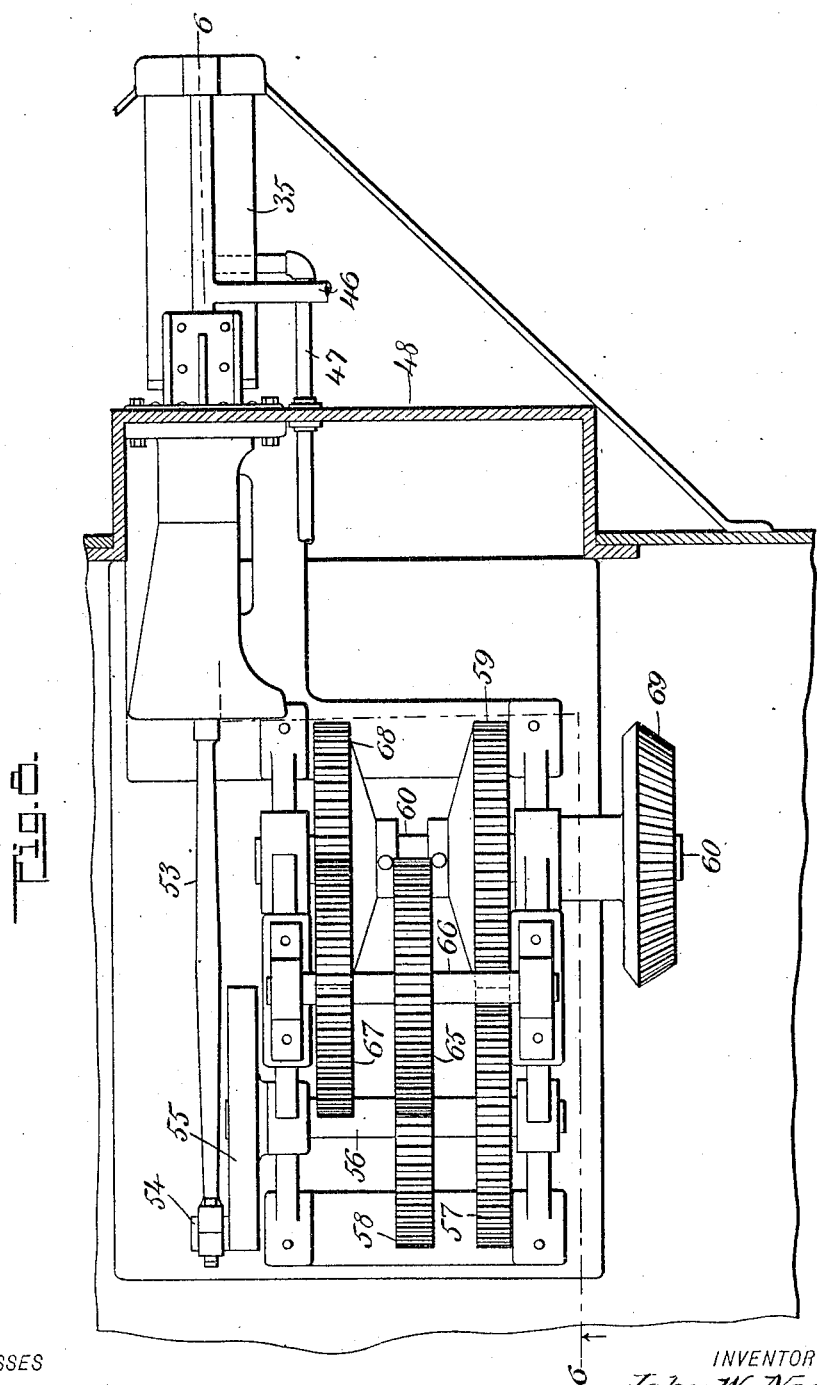

No. 851,549. PATENTED APR. 23, 1907.
J. W. NEAL.
WAVE MOTOR.
APPLICATION FILED JUNE 5, 1906.
5 SHEETS—SHEET 5.
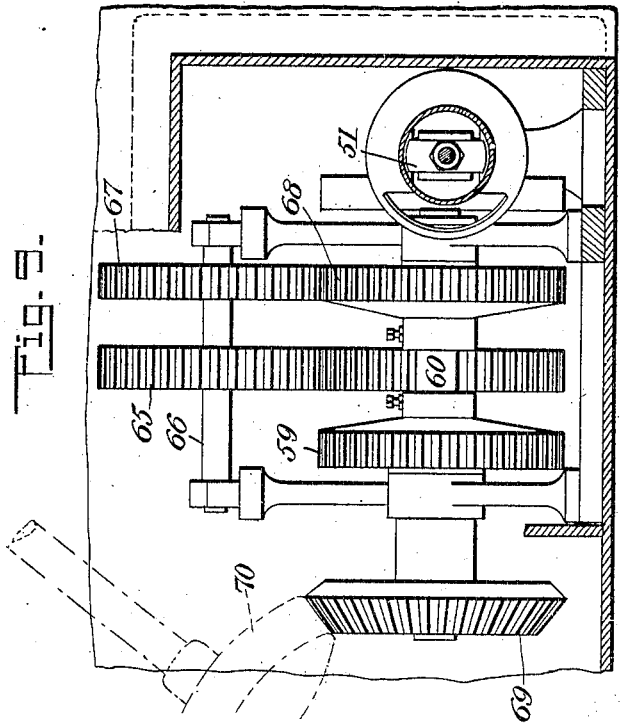
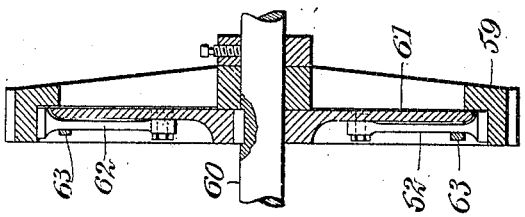
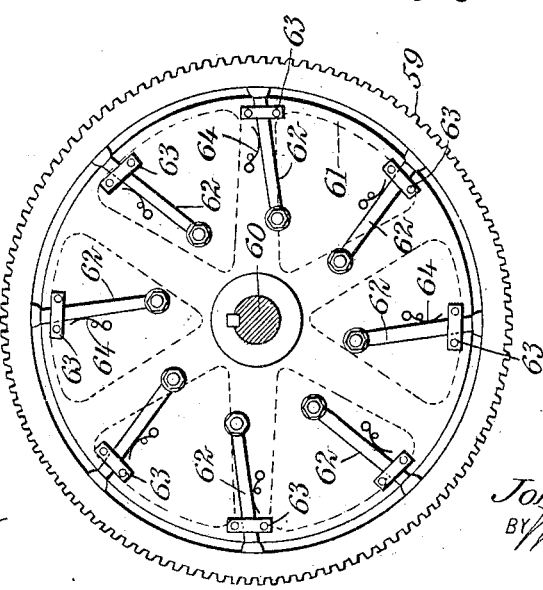
WITNESSES
INVENTOR
John W. Neal
BY
ATTORNEYS

UNITED STATES PATENT OFFICE.

JOHN WALKER NEAL, OF KEALIA, TERRITORY OF HAWAII.

WAVE-MOTOR.

No. 851,549.           Specification of Letters Patent.           Patented April 23, 1907.

Application filed June 5, 1906. Serial No. 320,270.

*To all whom it may concern:*

Be it known that I, JOHN WALKER NEAL, a citizen of the United States, and a resident of Kealia, Kauai, Territory of Hawaii, have invented a new and Improved Wave-Motor, of which the following is a full, clear, and exact description.

This invention relates to improvements in wave motors particularly adapted for use in deep seas, the object being to provide a deep sea motor so constructed as to respond readily to the movements of the water, such as waves and swells coming from every possible direction, and by means of which air is compressed and conducted to machinery on shore as a motive agent.

I will describe a wave motor embodying my invention, and then point out the novel features in the appended claims.

Reference is to be had to the accompanying drawings forming a part of this specification, in which similar characters of reference indicate corresponding parts in all the views.

Figure 1 is a general view showing a wave motor embodying my invention, as in operation; Fig. 2 is a top plan thereof; Fig. 3 is a top plan of the actuating mechanism employed; Fig. 4 is a side view thereof; Fig. 5 is a section on the line 5—5 of Fig. 3; Fig. 6 is a sectional elevation showing the pump or compressor gearing employed; Fig. 7 is an outer end view of one of the pumps; Fig. 8 is a plan of the pump or compressor gearing; Fig. 9 is a section on the line 9—9 of Fig. 6; Fig. 10 is a face view of one of the clutch-wheels employed; and Fig. 11 is a sectional view thereof.

A considerable portion of the mechanism shown in the drawing, that is the pump or compressor gearing, is similar to that shown and fully described in my application for patent on wave motor, filed March 16, 1906, Serial Number 306422; therefore, it is not deemed necessary to go particularly into the description of such mechanism.

Referring to the drawings, 10 designates a float, which may be of any desired size or shape, and of any suitable material. Extended upward from the corners of the float are supports 11, 12; these supports being hollow for the passing therethrough of shafting, as will be hereinafter described.

It will be noted that the supports 11 converge and are joined at the top, as are also the supports 12, and at the top portions, bearings are provided for shafts 13, 14, these shafts being carried by a truss frame 15 which has a lateral rocking movement for a purpose to be hereinafter described.

The main shaft 13 has at its outward end a bevel gear 16 which meshes with two bevel gears 17, 18, the gear 17 being connected through a shaft 19 extended downward through one of the supports, to the driving mechanism for a compressor 20; while the gear 18 has a shaft 21 extended downward and having driving connection with the gearing for another compressor 22 located on the same side of the float as the compressor 20.

The shaft 14 is rigidly secured to the frame 15 so as to rock therewith. On this shaft 14 is a bevel gear 23 meshing with two bevel gears 24, 25, the bevel gear 25 being connected to the upper end of a shaft 27 which has driving connection with the operating gearing for a compressor 28; while the shaft 29 to which the bevel gear 26 is connected has driving connection with the gearing for another compressor 30.

The inner end of the main shaft 13 has a bevel gear 31 meshing with a bevel gear 32 on a counter-shaft 33 to which a pendulum 34 is attached; if deemed necessary, the pendulum may be prevented from swinging too far outward, by means as here shown, of a chain 35 connecting with opposite uprights.

While I have shown the gearings above described as being provided with teeth throughout their circumference, it is obvious that the teeth need only extend a portion of the way around, because the said wheels are never fully rotated; in other words, they have merely a back and forth movement.

As before stated, the compressor mechanism is similar to that in the application above mentioned; briefly however, the same may be described as follows: As shown in Fig. 6, each compressor comprises a cylinder 35 having longitudinal ports 36, 37, which have pipe connection with machinery to be driven, on land, and also have pipe connections for drawing air from the land. The port 36 has openings 38, 39, at its ends which provide communication with the interior of the clyinder; these ports being provided, respectively, with flap valves 40, 41. The port 37 also, at its ends, has port communications 42, 43, with the interior of the cylinder, and these communications are controlled by valves 44, 45. In Fig. 7 I have clearly indicated the pipes 46, 47, through which the air passes. The compressor cylinders are extended outward from casings 48 which are secured to the sides of the float, and operating in each cylinder is a piston 49, the stem 50 of which connects with a cross-head 51 operating in a guide 52; and connected to the cross-head is a crank-rod 53 which engages with the wrist-pin 54 on the crank-wheel 55, the said crank-wheel being mounted on a shaft 56 to which is secured gear-wheels 57, 58; the said gear-wheels 57 meshing with a clutch-wheel comprising a ring-like gear 59 mounted loosely on a shaft 60; and rigidly connected to the shaft is a disk 61 on which are pivoted clutch arms 62 designed to engage with the inner surface of the ring-like member 59. These clutch arms are guided in loops 63 and the arms are held yieldingly by means of springs 64. The gear-wheel 58 on the shaft 56 meshes with a gear-wheel 65 on a shaft 66 which also carries a gear-wheel 67 meshing with the clutch device 68 which is mounted on the shaft 60 and is in all respects similar to the clutch device above described, but having its clutch arms extended in reverse direction to those of the first-named clutch. By this system of gearing the shaft 60 will be continuously operated in one direction; that is, when the shaft is driven by one clutch wheel the ring-like portion of the other clutch wheel will move around its disk loosely. On the several shafts 60 are bevel-gears 69 which mesh with bevel-gears 70 on the lower ends of the shafts extended through the supports.

In the operation, the float carrying its machinery is to be anchored at any sutiable point off shore. As the float rocks in one direction under the influence of waves or the like, the pendulum will swing, causing a rocking movement of the shaft 33, which through the mechanism described will impart motion to the pump gearing at one side of the float; as the float rocks in the opposite direction it will swing relatively to the frame 15, and as the shaft 14 is rigidly connected to said frame, the gearing for the pump mechanism at the opposite side will be operated. It will therefore be seen that the compression of air is practically continuous, no matter as to what motions may be imparted to the float.

Having thus described my invention I claim as new, and desire to secure by Letters Patent:—

1. A motor of the class described, comprising a float, uprights on the float, a frame supported by the float, with which the float has oscillating relation, a compressor mechanism operated by rocking movements of the float relatively to the frame, a counter-shaft supported in the frame, a pendulum arranged to swing lengthwise of the frame, said pendulum being supported from said shaft, and a compressor mechanism operated from said shaft.

2. A motor of the character described, comprising a float, uprights on said float, the said uprights being hollow, a frame having swinging connection with the uprights, shafts extended through the uprights at one side of the float, and having gear connection with said frame, compressor mechanism operated by said shafts, a main shaft carried by the frame, a counter-shaft having gear connection with the main shaft, a pendulum suspended from said counter-shaft, and compressor mechanism actuated from said main shaft.

3. A wave motor comprising a float, uprights on the float, a trussed frame having swinging connection with said uprights, a compressor operating mechanism operated by relative movement between said frame and float, a pendulum having a swinging movement lengthwise of the frame, and a compressor mechanism operated by movements of said pendulum.

4. A wave motor comprising a float, tubular divergent uprights at the opposite side of the float, a frame supported by the uprights, there being swinging relation between the said frame and float, a shaft rigidly connected to one end of said frame, two compressors at one side of the float, operating connections between said compressors and said shaft, a shaft arranged transversely in the frame, shafts extended through the supports at the said opposite sides of the float, compressors operated from said last named shaft, a pendulum suspended from the transverse shaft, and driving connections between said transverse shaft and the shafts extended through the last named uprights.

In testimony whereof I have signed my name to this specification in the presence of two subscribing witnesses.

JOHN WALKER NEAL.

Witnesses:
E. McCORRISTONE,
M. R. TEVIS.